US008347205B2

(12) United States Patent
Karim et al.

(10) Patent No.: US 8,347,205 B2
(45) Date of Patent: Jan. 1, 2013

(54) AUTOMATED GENERATION OF MULTIPLE VERSIONS OF A PUBLICATION

(75) Inventors: Shahriar Reza Karim, Old Tappan, NJ (US); Michael Lynch, Bronx, NY (US)

(73) Assignee: Integrated Software, LLC, Englewood Cliffs, NJ (US)

(*) Notice: Subject to any disclaimer, the term of this patent is extended or adjusted under 35 U.S.C. 154(b) by 1096 days.

(21) Appl. No.: 11/950,385

(22) Filed: Dec. 4, 2007

(65) Prior Publication Data

US 2008/0155390 A1 Jun. 26, 2008

Related U.S. Application Data

(60) Provisional application No. 60/868,394, filed on Dec. 4, 2006.

(51) Int. Cl.
*G06F 17/30* (2006.01)
*G06F 17/24* (2006.01)

(52) U.S. Cl. .............. 715/229; 715/234

(58) Field of Classification Search .............. 715/208, 715/229, 255, 224; 707/626, 627
See application file for complete search history.

(56) References Cited

U.S. PATENT DOCUMENTS

| | | | | |
|---|---|---|---|---|
| 5,963,968 A * | 10/1999 | Warmus et al. | .............. | 715/246 |
| 5,987,461 A * | 11/1999 | Dreyer et al. | .............. | 1/1 |
| 6,990,633 B1 * | 1/2006 | Miyasaka et al. | .............. | 715/201 |
| 2001/0051962 A1 * | 12/2001 | Plotkin | .............. | 707/522 |
| 2005/0120303 A1 * | 6/2005 | Behbehani | .............. | 715/540 |
| 2005/0289461 A1 * | 12/2005 | Amado et al. | .............. | 715/530 |
| 2006/0103064 A1 * | 5/2006 | Sittinger et al. | .............. | 270/52.14 |
| 2006/0248454 A1 * | 11/2006 | Giannetti | .............. | 715/517 |
| 2007/0055925 A1 * | 3/2007 | Giannetti | .............. | 715/511 |
| 2007/0055929 A1 * | 3/2007 | Giannetti et al. | .............. | 715/517 |
| 2007/0244916 A1 * | 10/2007 | Dreyer et al. | .............. | 707/101 |

* cited by examiner

*Primary Examiner* — Stephen Hong
*Assistant Examiner* — Ahamed I Nazar
(74) *Attorney, Agent, or Firm* — Trellis IP Law Group, PC

(57) ABSTRACT

In one embodiment, a method for generating a publication is provided. The method includes determining a template for one or more pages of the publication. A structured document for the publication is generated where the structured document includes entry fields corresponding to the one or more addressable blocks. The structured document is then sent to one or more entities to allow users to input information for different versions of the publication. After the entities enter in information, a structured document is received from each of the plurality of entities. Information in the structured document refers to version information. A design application version of the structured document is then generated from the different structured documents received from the plurality of entities. The plurality of versions of the publication is then automatically generated.

20 Claims, 10 Drawing Sheets

Fig. 4

| | D | E | F | G | H | I | J | K |
|---|---|---|---|---|---|---|---|---|
| | | | | | | | manuscript.xls | |
| 1 | page | type | box type | cit. | file name | state | html | notes |
| 2 | 144 | AQ1 | stateicon | X | | GA | | |
| 3 | 144 | AQ1 | teleftpage | | 144.pdf | GA | http://treausres.macmillanmh.com/georgia/?pick=1 | login icon |
| 4 | 145 | SO1 | link1 | X | | GA | 144.pdf | |
| 5 | 145 | SO1 | stateicon | X | | GA | http://treausres.macmillanmh.com/georgia/?pick=1 | |
| 6 | 145 | SO1 | terightpage | | 145.pdf | GA | 145.pdf | |
| 7 | 145 | SO1 | link2 | X | | GA | rubric.pdf | rubric |
| 8 | 145 | SO1 | link3 | X | | GA | 005_A4SWK_U1_FL.pdf | ancillary pg |
| 9 | 146 | AQ | teleftpage | | 146.pdf | GA | 146.pdf | |
| 10 | 147 | SO | terightpage | X | 147.pdf | GA | 147.pdf | |
| 11 | | | | | | | | |
| 12 | 144 | AQ1 | stateicon | X | | PA | | |
| 13 | | AQ1 | teleftpage | | 144.pdf | PA | http://www.macmillanmh.com | |
| 14 | 145 | SO1 | link1 | X | | PA | http://www.macmillanmh.com | |
| 15 | 145 | SO1 | stateicon | X | | PA | | |
| 16 | 145 | SO1 | terightpage | | 145.pdf | PA | 145.pdf | |
| 17 | 145 | SO1 | link2 | X | | PA | rubric.pdf | |
| 18 | 145 | SO1 | link3 | X | | PA | 005_A4SWK_U1_FL.pdf | |
| 19 | 146 | AQ | teleftpage | | 146.pdf | PA | 146.pdf | |
| 20 | 147 | SO | terightpage | | 147.pdf | PA | 147.pdf | |
| 21 | | | | | | | | |
| 22 | 144 | AQ1 | stateicon | X | | L | http://www.macmillanmh.com | |
| 23 | 144 | AQ1 | teleftpage | | 144.pdf | L | 144.pdf | |

AUTOMATED GENERATION OF MULTIPLE VERSIONS OF A PUBLICATION

CROSS REFERENCES TO RELATED APPLICATIONS

This application claims priority from U.S. Provisional Patent Application Ser. No. 60/868,394, entitled SYSTEM AND METHOD FOR AUTOMATED GENERATION OF MULTIPLE VERSIONS OF A PUBLICATION, filed on Dec. 4, 2006, which is hereby incorporated by reference as if set forth in full in this application for all purposes.

BACKGROUND

Particular embodiments generally relate to generating multiple versions of a publication.

For publications, such as textbooks, multiple versions may need to be generated. For example, different states may have different regulations that require a publisher to generate different versions of a textbook for each state. Multiple versions may include some content that is similar; however, certain portions of pages may be different. To generate the multiple versions, a first publication may be generated. The pages of the first publication are then duplicated and used to create the alternate versions of the publication. The duplication of a page of the first publication is generally performed after a page of the first publication is finalized. The changes for the other versions are then manually input by a user. For example, a group of page layout professionals customize each duplicate page for each respective version of the publication. Typically, the page layout professional would receive a text document or handwritten notes that indicate which changes are required to transform the page of the first publication into a page for the alternative version. The page layout professional then manually updates the page with new content. This process is very laborious and time-consuming. Also, it also introduces the possibility of human errors.

The use of handwritten notes to guide the versioning process is very laborious. Also, the number of page layout professionals needed to create alternative versions increases with the number of versions that are desired. In addition, duplicating each page of a publication many times makes it difficult to track global changes. Mistakes can be very costly, in terms of time and effort, if they are not discovered early in the versioning process. Also, if many professionals work on the various versions, each resulting version can have a different flavor of changes, i.e., not all of the versions of the publication are generated in the same way because each professional has his or her own style. The stylistic differences among professionals also can cause problems when the pages of the publication are updated in the future. For example, when an error is found, the error may exist only in a few of the versions, which makes finding, tracking, and then correcting the error more difficult.

SUMMARY

Particular embodiments generally relate to an automated publishing system configured to generate multiple versions of a publication.

In one embodiment, a method for generating a publication is provided. The method includes determining a template for one or more pages of the publication. A structured document for the publication is generated where the structured document includes entry fields corresponding to the one or more addressable blocks. For example, the structured document may include a spreadsheet that allows a user to input information for content that should be included in the publication. The structured document is then sent to one or more entities to allow users to input information for different versions of the publication.

After the entities enter in information, a structured document is received from each of the plurality of entities. For example, different structured documents are received for different versions of the publication. Information in the structured document refers to version information. For example, the version information may be images, text, etc. that should be used to customize pages of the specific version. A design application version of the structured document is then generated from the different structured documents received from the plurality of entities. The design application version is compatible with a design application that is used to generate the publication. The plurality of versions of the publication are then automatically generated. A publication is generated using the template and the design application version for one of the plurality of entities using version information included in the structured document. Base content that is the same throughout the versions is added to each version's customized page to create all of the versions automatically.

The above process is an automated version publishing system that generates all versions of the publication. The versions may be generated quickly and ensures that base content in various versions is consistent. In addition, other versions may be produced as desired and can be created at low cost and quickly. Control of the production of multiple versions of the publication is centralized and can be easily managed.

A further understanding of the nature and the advantages of particular embodiments disclosed herein may be realized by reference of the remaining portions of the specification and the attached drawings.

BRIEF DESCRIPTION OF THE DRAWINGS

FIG. 4 depicts an example of a structured document according to one embodiment.

DETAILED DESCRIPTION OF EMBODIMENTS

An automated publishing system centralizes content data storage and management so that multiple versions of a publication can be generated efficiently and quickly. The automated versioning publishing system provides that all versions of the publication can be generated quickly and ensures that the content in the various versions is consistent. In addition, the system provides that additional versions, as desired, can be created at low cost and quickly, also using the same automated processing. Control of the production of multiple versions of a publication is centralized, for example, within a central processor including a server which can be communicatively coupled to a plurality of remote content suppliers, and therefore easily managed.

Figure 1:
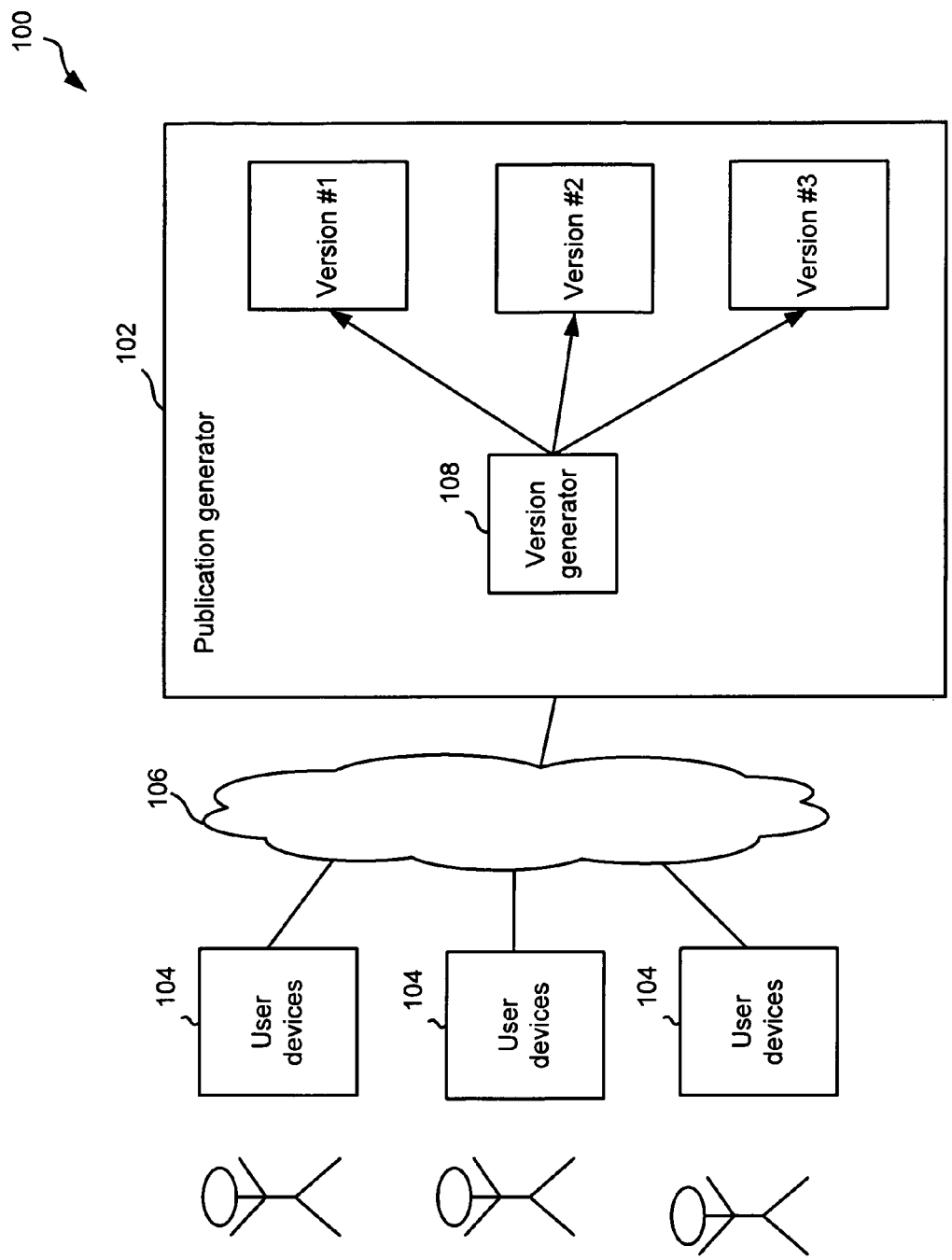
FIG. 1 depicts a simplified system for creating multiple versions of a publication according to one embodiment.

FIG. 1 depicts a simplified system 100 for creating multiple versions of a publication according to one embodiment. System 100 includes a publication generator 102, one or more user devices 104, and a network 106.

Publication generator 102 is configured to automatically generate publications. For example, textbooks, books, manuscripts, catalogs, direct mail, web pages, or any type of document with a defined layout. Publication generator 102 may be part of a computing device, such as a server, personal computer, work station, distributed computing system, etc.

A version generator 108 is configured to generate multiple versions of a publication. A version of the publication may be where different versions may include some content that differs between versions. Some content, referred to as base content, may be similar in each version. However, certain content, referred to as version information, may be different in each version. For example, for a textbook, different states may have different regulations or requirements thus requiring different state-specific information that needs to be included in different state textbooks. The state-specific information may be added to the base content to create a version for a state.

As will be discussed in more detail below, a structured document may be generated to allow users to input version information for each different version. In one example, a structured document may be sent to different entities for the different versions. An entity may include any business, user, organization, or other group that is responsible for creating a version of the publication. For example, if the State of Georgia will produce a first version, then a structured document for Georgia may be sent to a first entity. Also, a second structured document for the State of California may be sent to a second entity. For discussion purposes, the structured document will be discussed as being sent to a user; however, it will be understood that multiple users may receive and input information for the structured document.

In one example, publication generator 102 may communicate with user devices 104 through network 106. Entities, such as multiple users, may use the user devices 104 to provide input to the structured document. In one example, the structured document may be a spreadsheet that includes a number of structures, such as tables or columns. In other embodiments, the structured document may be accessed through a web interface. In this case, the interface may be web-based spreadsheet or include other web-based structures. The user may be able to input version information into the structured document. The version information may include a text, icons, images, file name, parameter information, comments, or any other information needed to generate the versions. A folder structure may also be included in the structured document that is used to store the version information, such as the images. Once the structured document has been filled in by the user, it may be sent back to publication generator 102.

Publication generator 102 is then configured to generate multiple versions of publication. The multiple versions are generated automatically. As will be discussed in more detail below, the different structured documents may be merged together and converted to a design application format. For example, the design application format may be a format that is compatible with a design application that is used by version generator 108. In one example, the application may include an Adobe InDesign, QuarkXPress, Microsoft Word, Adobe Illustrator, Framemaker application, or any program with which a page or graphic can be designed. Version generator 108 is then configured to use a template generated for the publication to automatically generate pages for the different versions. For example, different layouts and content are generated for a page based on the version information inputted into the structured document.

The process of generating the versions of publication will be described in more detail below. The process is neutral to any document markup language, such as XML; therefore it can work with or without XML or any particular markup. First, templates for the publication may be generated. The template may include instructions and/or codes corresponding to the version information to be placed on a particular page. The codes may be used to match version information entered in by a user using a structured document to be blocked on the page and is also used to apply stylistic formatting to the version information according to the version of the page in which the content is being placed.

Figure 2:
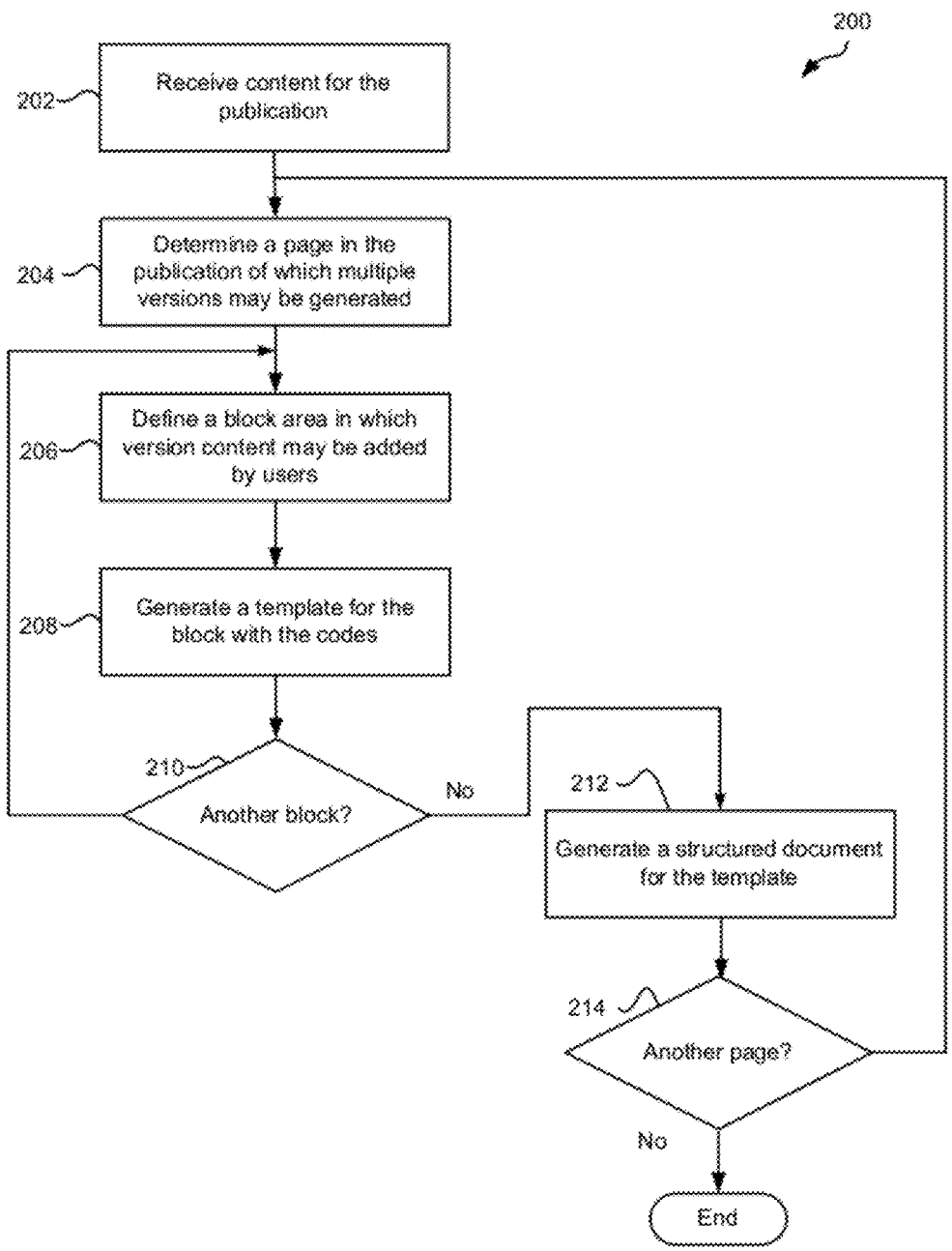
FIG. 2 depicts a simplified flowchart of a method for generating templates according to one embodiment.

FIG. 2 depicts a simplified flowchart 200 of a method for generating templates according to one embodiment. Step 202 receives content for the publication. The content may include base content that may be included in each of the multiple versions. The base content may be received from various sources.

Step 204 determines a page in the publication of which multiple versions may be generated. In one example, for each page of a publication for which multiple versions are to be generated, base content may be determined.

Step 206 defines a block area in which version information may be added by users. The blocks may be associated with codes that identify the blocks on the page. These codes may follow a specific naming convention that uniquely identifies the block area and fields in the structured document are associated with codes to identify the block area in which version information entered by user is associated.

Step 208 determines a template for a block associated with the code. The template may include the base content and encoded block areas. The template may include the base content or white space where the base content can be added later. When the version information is later received, it may be inserted into the appropriate block areas of the template to produce the versioned page.

The template may be associated with information that allows the structured document to be used to create the versioned page. For example, the location and/or size of the blocks on the page are determined. The location and size may be different for different versions. When the version information is inputted into the structured document, it can be inserted into the template using the location and size.

Step 210 determines if additional blocks need to be processed. For example, a page may have multiple blocks in which version information should be inserted. If there are other blocks, the process reiterates to step 206.

If there are no more blocks, step 212 generates a structured document for the template. For example, codes for the blocks may be associated with fields in a table structure, such as columns in a spreadsheet document. Also, other identification information for the template may be added to the structured document, such as identifiers (e.g., the page number, the version identifier (ID), chapter ID, Section ID, unit ID). This will guide a user in inputting version information into the structured document. The process of generating the structured document will be described in more detail below.

Step 214 determines if another page in the publication will include multiple versions. For example, a second page of the publication may have multiple versions that need to be processed. If so, the process reiterates to step 204 where another page is determined. Another template may be generated for the additional page. Also, information for the template may be added to the already created structured document or a new structured document may be created. If no other pages are included in the publication, the process ends.

The process of generating the structured document will be described in more detail. The structured document may be a content input program, which may be a document that includes instructions that allow version information to be automatically associated with the blocks in the template to generate a version of the page. For example, codes may be used in the structured document in addition to macros, software instructions, or other program elements to identify and process the version information.

Figure 3:
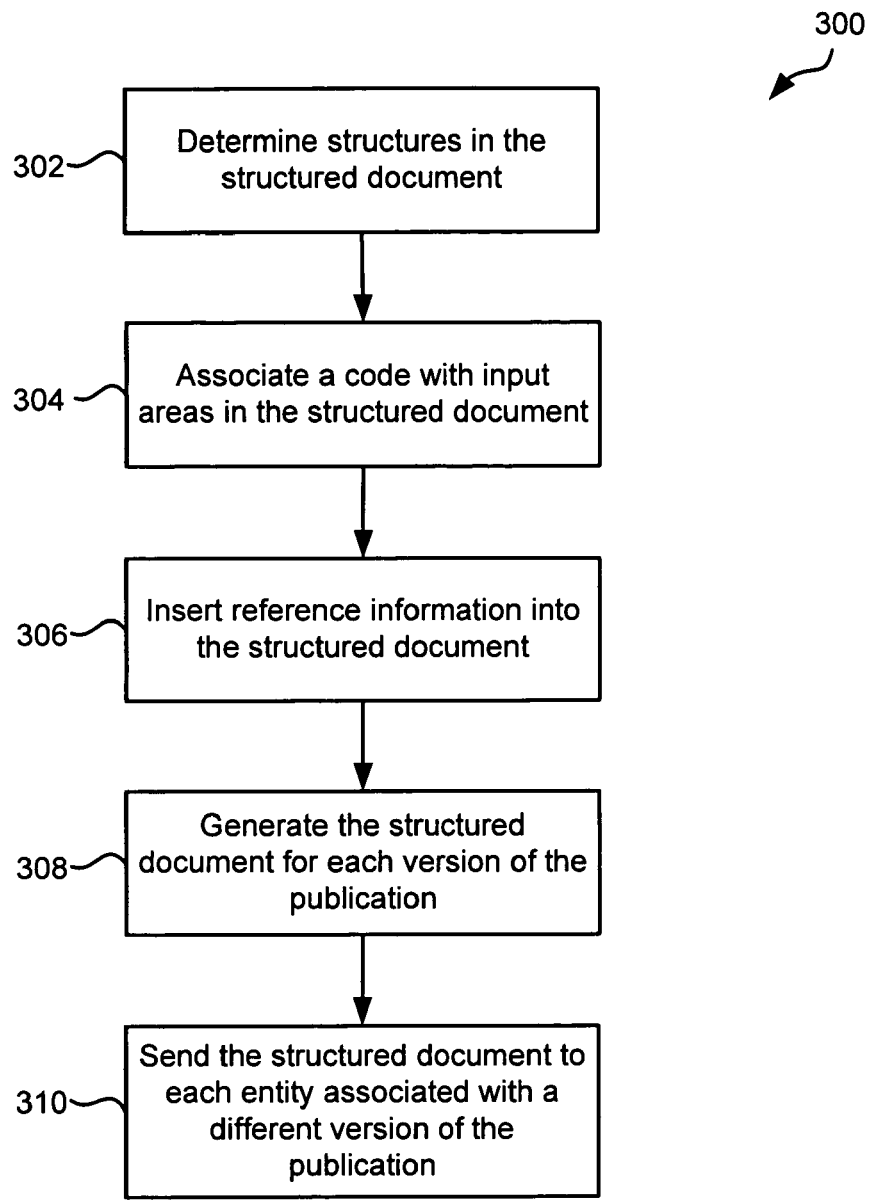
FIG. 3 depicts a simplified flowchart of a method for creating the structured document according to one embodiment.

FIG. 3 depicts a simplified flowchart 300 of a method for creating the structured document according to one embodiment. Step 302 determines structures in the structured document. The structures may include columns in which version information can be input. Also, the structures may be portions of a web page. The structures allow a user to input information for the version information. For example, entry boxes are included in the structures. The structured document may also include a folder structure. The folder structure may be used to store version information, such as icons, text, images, or other content.

Step 304 associates a code with input areas in the structured document. For example, certain entry boxes may be associated with a code. The code may correspond to a block area in the template in which version information referred to in the input area would be inserted. For example, the code may be a type of version information, such as a state icon type. When information is entered for a state icon, the template block associated with the state icon can be determined and the version information inserted in that template block.

Step 306 inserts reference information into the structured document. The reference information may include reference information that would guide a user in determining which version information to input. For example, the page number of each version of the publication and any identifiers, such as unit, chapter, section, or other page information may be inserted into the structured document. Also, instructions on what should be input may be placed in the structured document.

Step 308 generates the structured document for each version of the publication. The structured document may also include generating a folder structure that would store the content. For example, a user may enter in a reference, such as a file name, for version information that is stored in the folder structure. The folder structure may also organize information in a structure that is compatible with a design application that will be used to generate the publication. The folder structure may also include the correct naming convention for the design application. For example, the design application may need to read files with a certain extension, such as <filename.designapplication>. If a URL is used, the version information may be retrieved from a web page in which the URL refers.

Step 310 sends the structured document to each entity associated with a different version of the publication. The entities may then input version information into the structured document. When each user receives the structured document, the user can enter in the version information that the entity desires. For example, for the State of Georgia, different version information may be entered in for a page that is different from version information for the State of California. If a spreadsheet document or web interface is used, the user would enter in different version information in entry boxes in the structured document. The version information entered in may include a reference to the content, such as a URL, file name, etc. The version information may also be stored in the folder structure of the structured document. For example, all version information for a page may be stored in a folder, such as text, icons, images, or other content. When this process is finished, the entity may send the structured document back to publication generator 102. Publication generator 102 may then create the different versions of the publication when all structured documents have been received.

FIG. 4 depicts an example of a structured document shown in an interface 400 according to one embodiment. As shown, the structured document includes a plurality of columns 402. Some columns may include reference information that may indicate to the user which version information is desired. For example, the unit, chapter, section, and page columns describe where in the publication the version information may be inserted. Also, the page type and citation show the type of page and if a citation is needed.

The file name column allows the user to specify the file name for the version information that may be input. Also, the State column shows which version the row may be associated with. Although State is mentioned, it will be understood that versions other than States may be provided. The HTML column is a reference to where the content is stored. For example, a uniform resource locator (URL) indicates where the content can be retrieved from the WorldWide Web. The structured document can contain selective content, e.g. URLs, which will only show up on certain type of output, e.g. embedded links in PDF. The URL may also point to content that is ultimately added to the versioned page. For example, the URL is used to retrieve content at a location referenced by the URL and the content is inserted in the versioned page.

Also, a filename can be used to reference version information that is stored in the folder structure. The notes column may also be used by user to enter in notes that guide any manual steps that need to be taken, such as proofreading the version generated.

Any version information may be stored in a folder structure (not shown). The online, database-linked submission of documents/manuscripts by users can be date-time tracked. This may be useful for project management. For example, the submissions can be compared against the planned timeline, thus allowing monitoring of progress in terms of 'actual vs. plan'; this, in turn, generates early and late status for tasks, and notifications to the individuals responsible, and their managers, that the work is early or late. The submission of version information can be done in parallel, and can be processed in parallel (eliminating need for multiple staff members to monitor and track submissions). This may be different if extensible markup language (XML) or other markup language. XML requires a document type definition to be used that is specific to XML. However, the structured document may be used to create any type of markup language or other code. This is because the structured document is used to create the design application language version. The version information is agnostic of any format associated with the design application language.

A user can input information in the structured document in the entry boxes where required. In one embodiment, the structured document is in a form that is familiar to a user and easy to use. For example, the user can type in references to version information, such as file names, URLs, etc. This can be done in a spreadsheet that is easy for a user to use. Also, the web interface may allow for a user to enter in values. The ease of use of the structured document differs from having a user create code for a design application. Typically, the format needed for input to a design application is in a language that is unfamiliar to a user, such as JavaScript or C code may need to be written. Using the structured document, users can easily input information to allow for versions to be automatically generated.

The generation of a version of the publication may not begin until all the necessary content is available for creating a page. However, the gathering of the version information for the version of the publication may be performed in parallel. For example, writers can write a manuscript, artists can create images, and other acts may be performed to determine version information for the structured document. The structured document may be used to input the version information and coordinate the writing, preparation, design, and production that can be performed in parallel. The finished structured document may then be sent to version generator 108 to allow for the version to be completed. Thus, the version generation requires machine-to-machine interaction and eliminates machine-to-person interaction. When there is machine-to-machine interaction, the process can be automated, whereas machine-to-person interaction may be a manual process. Thus, the gathering of the version information may be performed in parallel, but once the structured document has been finalized, the version may be automatically generated.

Figure 5:
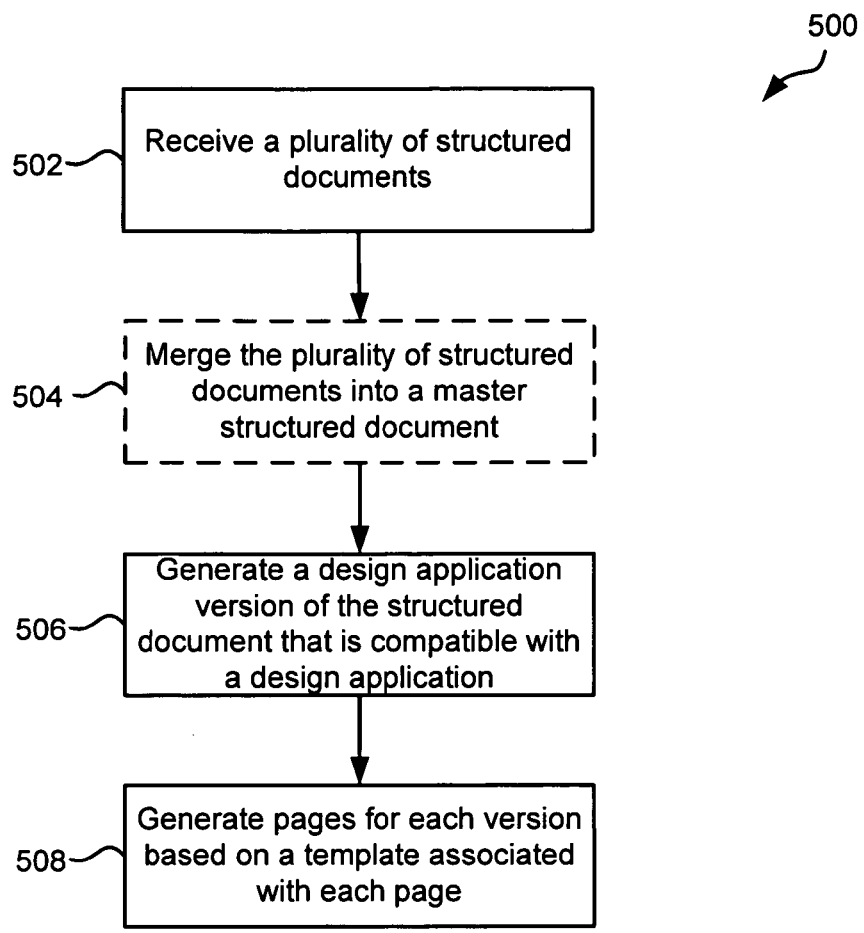
FIG. 5 depicts a simplified flowchart of a method for generating a page for a version according to one embodiment.

FIG. 5 depicts a simplified flowchart 500 of a method for generating a page for a version according to one embodiment. Step 502 receives a plurality of structured documents. For example, a structured document for each version may be received. The information in each structured document may be verified. For example, version generator 102 may verify that the file names or lengths of files are valid and refer to version information in the folder structure. If the structured document does not include valid information, it may be automatically or manually fixed. For example, the links or references may be fixed.

Step 504 merges the plurality of structured documents into a master structured document. Although the merge is performed, it will be understood that merging structured documents into a master structured document may not be necessary. However, merging the structured documents into a master structured document may provide advantages because a single document may be input into a design application.

Step 506 then generates a design application version of the structured document that is compatible with a design application. For example, the structured document may be in a format that is easy for a user to input information into. However, the format required by the design application may not facilitate easy input for the user. For example, the version compatible with the design application may be a JavaScript or C program. It may be easier for a user to input information into a spreadsheet rather than writing JavaScript or C code. Version generator 108 is configured to automatically convert the structured document into a version compatible design application. Commands in the structured document are translated into the design application format. For example, page type is a type of page and box type defines one of the structure types that can go on the page. These types are used to determine a block on the templates. For example, the code of box type may be a state icon. This is used to determine a block in the template that is associated with the state icon code. The design application version may be code for a version page that will be generated if the code is inputted into the design application.

Step 508 generates pages for each version based on a template associated with each page. For example, the version information associated with a structured document may be merged into the template for a page. The codes for each block on the page may be used to determine the version information to be inserted into the page. This process may be performed for each page of the version. For example, the correct images and text may be inserted into the blocks to create a version of a page. In other embodiments, a shell is created by a layout professional. The shell includes the base content while the template includes the addressable blocks. The template includes information that allows the shell to be completed using the version information. Once the version information is received, the template is used to insert the version information into the shell to produce a page for the version. In one example, the design application code that is generated in step 506 is input into the design application to automatically generate the versioned pages. This process is described in more detail with reference to FIG. 6.

Figure 6:
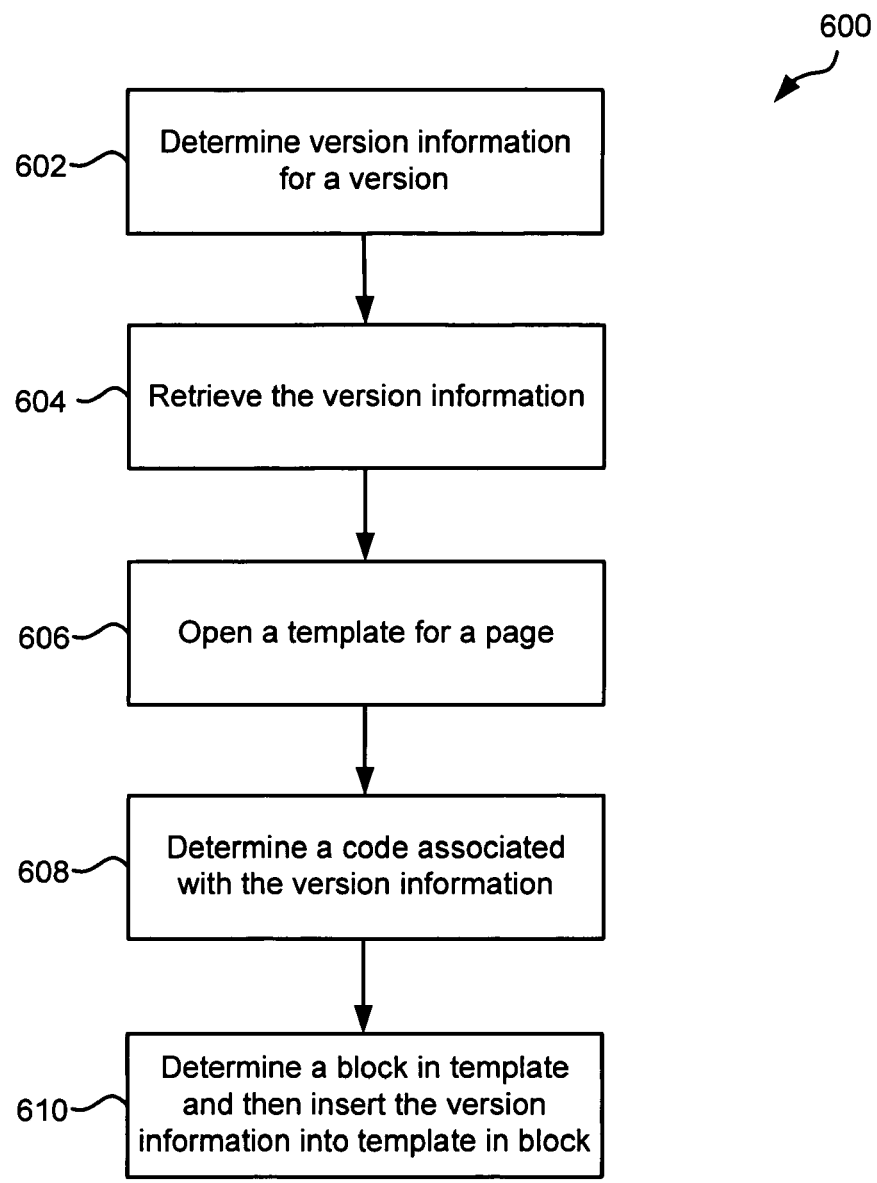
FIG. 6 depicts a simplified flow chart of a method for generating a page for a version according to one embodiment.

FIG. 6 depicts a simplified flow chart 600 of a method for generating a page for a version according to one embodiment. Step 602 determines version information for a version. For example, this may be an icon, text, or other version-specific information. Version generator 108 may use the structured document to determine the version information that should be inserted into the page. For example, an entry box in the structured document may be parsed to determine a reference to a file in the folder structure.

Step 604 retrieves the version information. For example, version generator 108 uses the reference to retrieve the version information that is stored in the folder structure. For example, the file name and/or link may be used to determine the version information. Also, version generator 108 may retrieve the version information directly from the structured document if it is stored in the structured document. In one embodiment, all version information for a page may be retrieved for each version.

Figure 7:
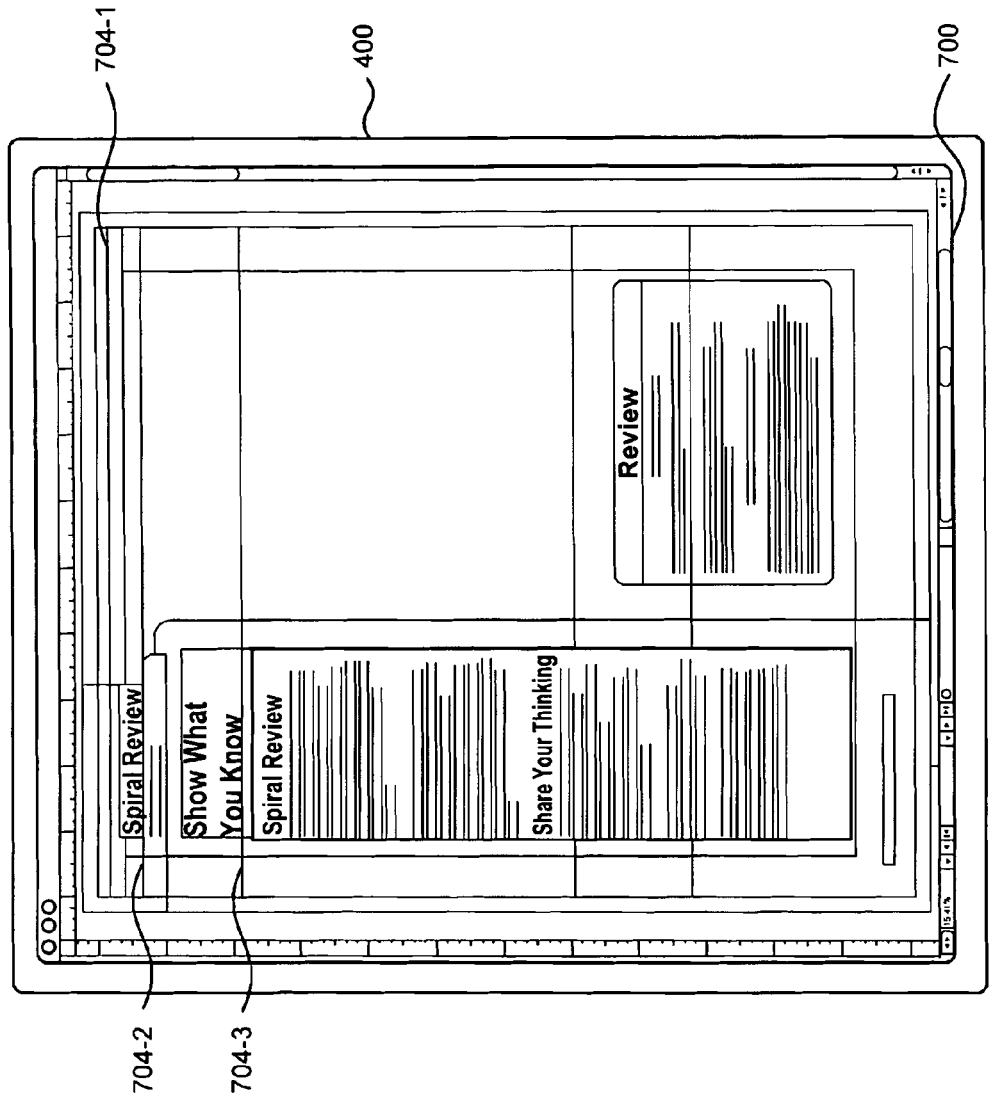
FIG. 7 depicts an example of a template according to one embodiment.

Step 606 opens a template for a page. The template may be the same for each version of a page. FIG. 7 depicts an example of a template according to one embodiment. As shown, a template 700 includes base content 702. Base content 702 includes content that is included in each version. Also, template 700 includes blocks 704 in which version information may be inserted.

Referring back to FIG. 6, step 608 determines a code associated with the version information. For example, an entry box in the structured document may have been associated with a code, such as state icon. This code is then used to identify a block 704 in template 700. Step 610 determines a block 704 in template 700 and then inserts the version information into template 700 in block 704. For example, image or text may be inserted into template 700. The version information for each version may be inserted into template 700 to generate a versioned page at this step.

Figure 8:
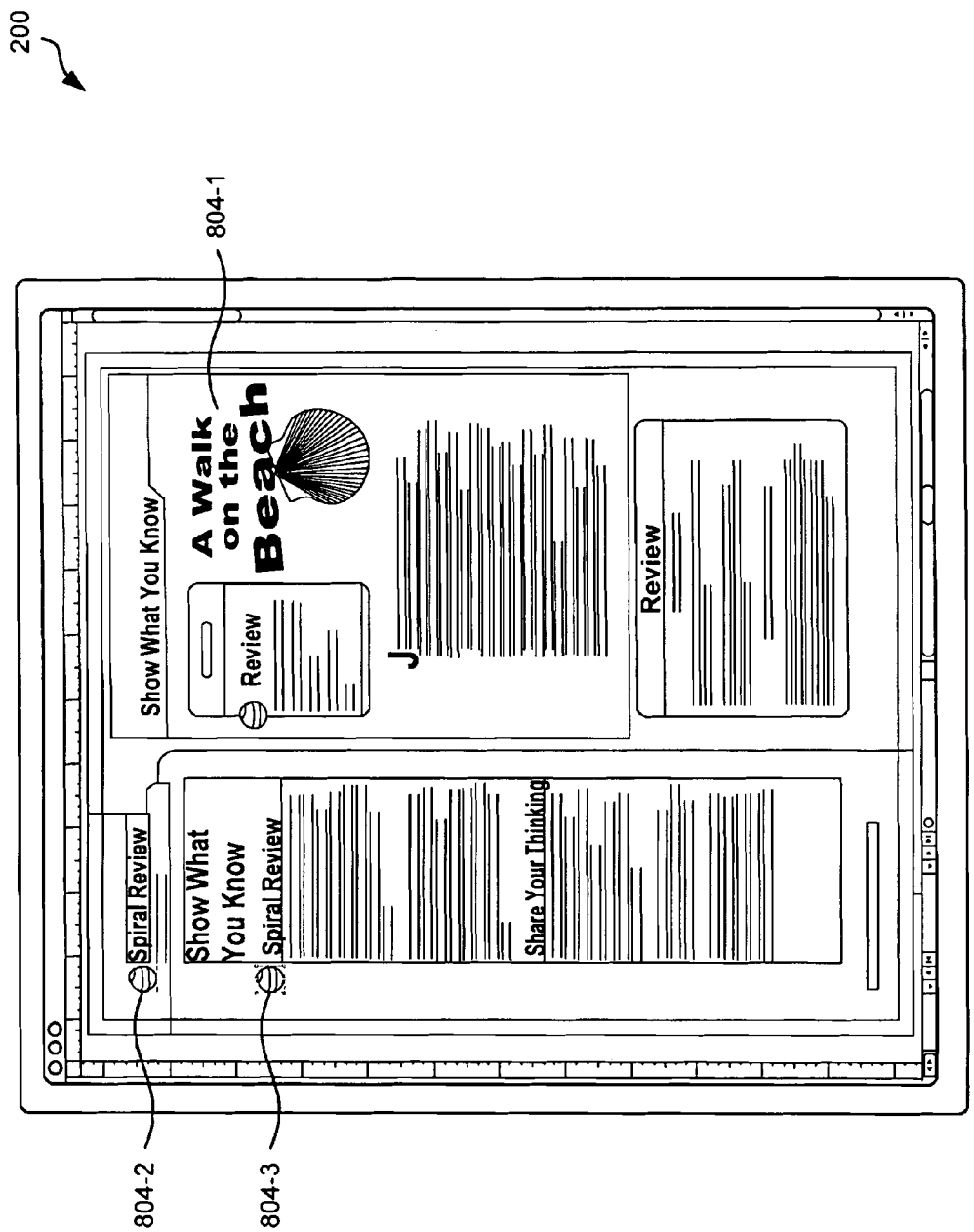
FIG. 8 shows an example of a finished page for a version according to one embodiment.

FIG. 8 shows an example of a finished page for a version according to one embodiment. As shown, version information has been inserted in a block 804-1. This includes text and images. Further, other version information has been inserted in block 804-2, and 804-3. For example, icons for the state have been inserted in blocks 804-2 and 804-3. The URL for entry box 409 is used to retrieve content (e.g., a state icon). The state icon is then inserted into the version page. However, base content 702 remains the same for each version.

Figure 10:
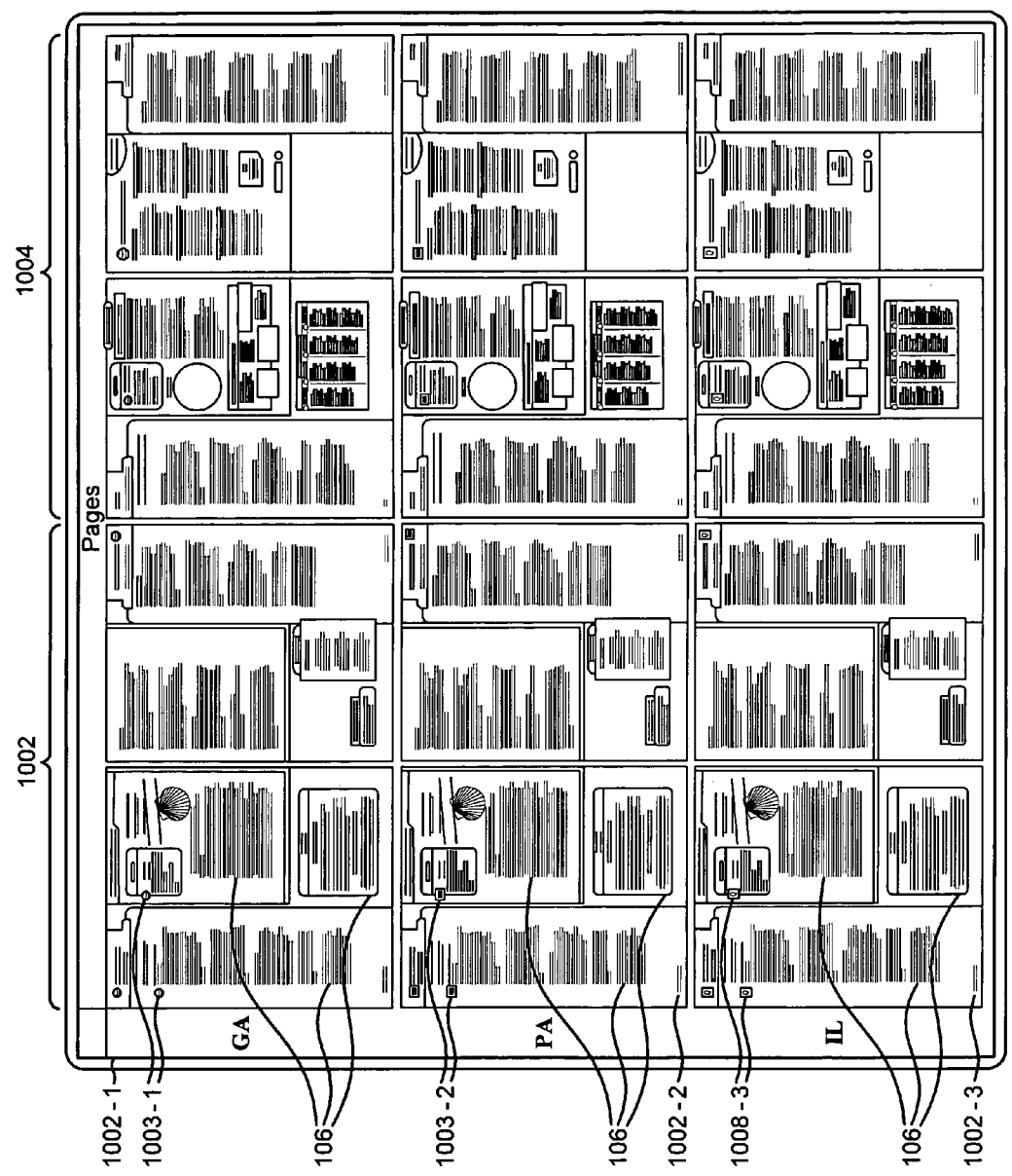
FIG. 10 depicts an example of multiple versions of the publication according to one embodiment.

FIG. 10 shows an example of an output for multiple versions according to one embodiment. Three versions of a first page 1002 and three versions of a second page 1004 are shown. The −1 pages are a version for Georgia, the −2 pages are pages for Pennsylvania, and the −3 pages for pages for Illinois.

First pages 1002 contain the same base content 1006. However, different first pages 1002 contain different version content. For example, a different icon 1008 is included on pages 1002-1, 1002-2, and 1002-3. Referring to FIG. 4, version information in the structured document is used to create the different icons 1008. In row 406, the state icon for Georgia is referenced by a URL 408 in entry box 409. This URL may include a .jpeg of the icon. Also, the box type of state icon is used to determine what the version information is. In entry boxes 410 and 412, the state icon for Pennsylvania and Illinois are referenced by URLs 414 and 416. This URL may include a .jpeg of the icon.

By inputting the version in formation in the entry boxes, version generator 108 can automatically generate the different versions of the page. The entry boxes are associated with codes that refer to the template. This allows version generator 108 to insert version information into the template.

After all the pages or some of the pages have been generated, the version of the publication may be proofed. The proof may be manually or automatically performed. If any changes are needed, they may be automatically or manually performed.

In some cases, missing tasks may be kept track of for content that is not ready for insertion into a template to form a page. The structured document stores the version information, which may be 'chunks' of content (text, image references or file names, PDF references, PDF references). If the user entered all version information that is necessary to produce the page into the structured document, each element of the version information is identified immediately, and up front, with its final assigned name (this could be a meaningful name, or just a sequence number; but it is permanent). This means that when the page is created, one knows exactly what it should be named. A naming convention may be used for the structured document. For example, exact naming conventions refer to required images, pdfs, photographs; these are final names which do not change during the process. If the final name is not known, then a temporary name can be applied, and a placeholder image used (labeled 'Missing Image'), which is to be replaced by a final name and image when it becomes available. Temporary names follow particular naming convention and are stored in a separate list, or data table. When the final image becomes available, the status is changed in the lookup table, and all instances of the placeholder image sought out and replaced, wherever they are in the production process (prior to final release). No final release occurs when there are placeholder images remaining in a document A missing task may be created as a placeholder for the content when it is available. For example, any missing item is automatically placed on a task list (for copy writing, image gathering, whether custom photography, stock art or photographs, or vendor-supplied (e.g., National Geographic, Pepsi, etc.), art and logos). And the design application knows when it is available, so it replace the placeholder for the 'missing element' with the actual element (whether text, image, file, URL, or pointer). This list of 'missing elements' is equivalent to a list of 'missing tasks'. The list of missing tasks decreases as the missing content is created, entered, or found one-by-one and when there are no more missing elements, there are no more missing tasks.

Particular embodiments reduce the time for creating a version page of a publication, such as the 30 seconds per page. The version information is placed in the correct location on a page of the version each time, and all pages of various versions include the same consistent base content. Information concerning all versions of a publication is included in a centralized storage location and content inserted into the pages of the publication may be in a searchable form. Particular embodiments allow version information to be gathered in parallel. However, in one embodiment, production of the versions may be performed once all version information has been received. This allows the machine-to-machine automated process of generating the versions. By having the version information before beginning production: this allows immediate, full, and distributed completion of the page to take place, including derivative products (PDF, HTML, etc.). Also, subsidiary products (versioned pdf's, HTML, jpeg) can be created using a supplementary, follow-on process after pages are composed. That is, a multiple page document can be created from the versioned page. Also, although not necessary, complete gathering of content before start of production allows the manufacturing process is scalable, distributable over time and space. For example, different version generators 108 may create versioned publications. In one example, different version generators 108 can create different versions as desired.

Figure 9:
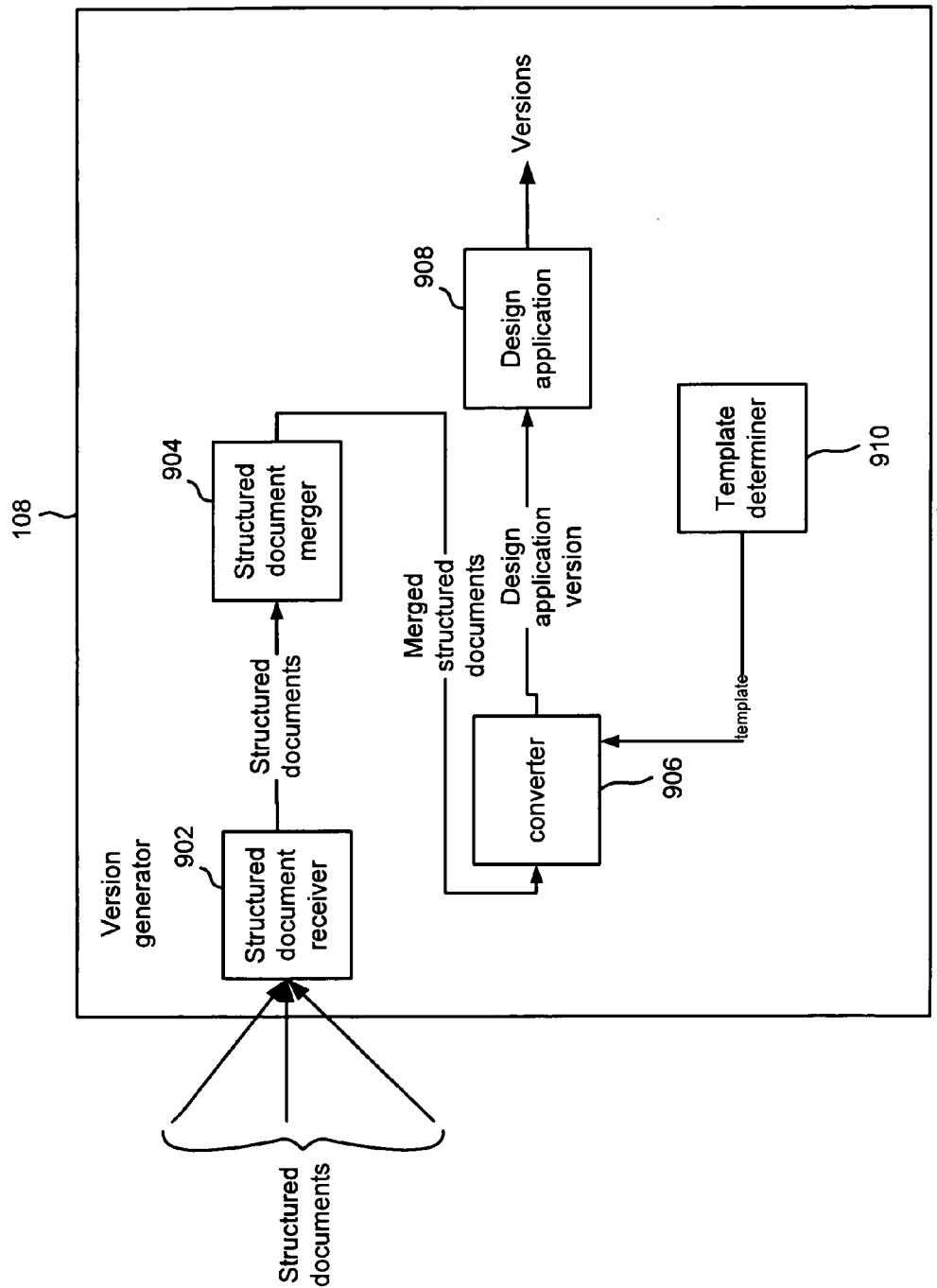
FIG. 9 depicts a more detailed example of a version generator according to one embodiment.

FIG. 9 depicts a more detailed example of version generator 108 according to one embodiment. A structured document receiver 902 receives structured documents from a plurality of entities. A structured document merger 904 merges the structured documents into a single master structured document.

A converter 906 is configured to convert the master structured document into a design application format. For example, a JavaScript file may be generated. A design application 908 may then be used to generate the versions of the publication. A template determiner 910 may determine a template for each page and inputs the template into design application 908. Design application 908 may then process the version of the master structured document using the templates to generate pages for the versions of the publication. The outputted pages of the publication may be electronic document (e.g., PDF, hypertext transfer markup language (HTML), jpegs, extensible markup language (XML)), a printed document, tagged markup document, extensible markup language (XML) document, multi-layered application files, printable files/documents, database files, or web linked pdfs. The output can be directed to multiple products simultaneously (either in parallel, or in sequence but automated).

Although the description has been described with respect to particular embodiments thereof, these particular embodiments are merely illustrative, and not restrictive. Although publications are described, it will be understood that other text-based items may be created using particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method for generating a publication, the method comprising:

generating a template for one or more pages, the template including one or more address sable blocks;

receiving base content, wherein the base content is content that remains the same for different versions of the publication;

generating at least one structured document for the publication, each structured document including one or more entry fields corresponding to the one or more addressable blocks, wherein each structured document includes or refers to version information in the one or more entry fields, and wherein the version information is content that is different for different versions of the publication;

receiving a plurality of structured documents, wherein each structured document is received from each of two or more entities;

merging the plurality of structured documents into a master structured document;

generating a design application version of the structured document from each of the two or more entities, the design application version compatible with a design application; and automatically generating a plurality of versions of the publication using the design application, wherein the generating of the plurality of versions of the publication is performed after the merging the plurality of structured documents from the two or more entities into the master structured document, wherein each version of the publication is generated using the template, the base content, and version information included in or referred to in at least one structured document received from the two or more of the entities, the version information inserted based on the one or more addressable blocks in a page of the version based on the one or more codes associated with the one or more entry fields;

displaying the plurality of versions of the publication on one page, wherein the page includes a plurality of sections, wherein the sections include the same base content, wherein each section is associated with a different version, wherein each version is associated with a different entity of the two or more entities, wherein each section includes different version information that corresponds to a different entity, and wherein after all pages of the publication have been generated, the pages are changeable if needed; and after generating a structured document that includes a first page of the publication with multiple versions:
determining if a second page of the publication is to include one or more versions;
generating a template for the second page; and
adding version information for the template for the second page to one of a structured document that is already created or a new structured document that is generated for the template for the second page.

2. The method of claim 1, further comprising sending the structured document to the two or more entities of a plurality of entities, wherein each entity of the plurality of entities is remote, and wherein each entity represents a different geographic region.

3. The method of claim 2, wherein the at least one structured document includes a reference to the version information, wherein the reference is used to retrieve the version information to generate a version of the publication, wherein the reference is a uniform resource locator (URL), and wherein each section is configured to receive an input that includes a URL, wherein each URL references version information to be inserted into a corresponding section.

4. The method of claim 1, wherein a plurality of pages are created for a plurality of versions using the template and different structured documents.

5. The method of claim 1, further comprising sending the structured document to a plurality of entities to allow each entity to input version-specific information.

6. The method of claim 1, further comprising merging the plurality of structured documents into a master structured document for input into the design application.

7. The method of claim 1, further comprising:
generating a list of missing tasks corresponding to version information that is missing from a page; and
determining a page is ready for output when the list of missing tasks has been completed.

8. The method of claim 1, wherein the page for the version is created using base content that is similar for each of the versions, and wherein each of the versions includes different version information.

9. The method of claim 1, further comprising:
determining an entry field including version information referred to or included in the entry field;
determining a code associated with the entry field;
determining an addressable block in the template associated with the entry field; and
inserting the version information in the page for the version based on the addressable block.

10. The method of claim 9, further comprising retrieving the version information from a folder structure or another source based on a reference included in the entry field.

11. A method comprising:
outputting a structured document for creating multiple versions of a publication, the structured document including entry areas for input regarding version information used to create a version in the multiple versions of the publication automatically, wherein the version information is content that is different for different versions of the publication;

receiving an input for each entry area in the structured document, receiving a plurality of structured documents, wherein each structured document is received from each of two or more entities;

merging the plurality of structured documents into a master structured document;

generating a design application version of the structured document from each of the two or more entities, the design application version compatible with a design application;

automatically generating a plurality of versions of the publication using the design application, wherein the generating of the plurality of versions of the publication is performed after the merging the plurality of structured documents from the two or more entities into a master structured document;

displaying a plurality of versions of the publication on one page, wherein the page includes a plurality of sections, wherein the sections include a same base content, wherein each section is associated with a different version, wherein each version is associated with a different entity of the two or more entities, wherein each section includes different version information that corresponds to a different entity, and wherein after all pages of the publication have been generated, the pages are changeable if needed; and after generating a structured document that includes a first page of the publication with multiple versions:
determining if a second page of the publication is to include one or more versions;
generating a template for the second page; and
adding version information for the template for the second page to one of a structured document that is already created or a new structured document that is generated for the template for the second page.

12. The method of claim 11, wherein the structured document comprises a code, wherein the code is associated with the entry area, the code indicating a location in the version of the publication to insert the content.

13. A non-transitory computer readable storage medium comprising software encoded in one or more tangible media for execution by the one or more processors and when executed operable to:
generate a template for one or more pages, the template including one or more address sable blocks;

receive base content, wherein the base content is content that remains the same for different versions of the publication;

generate at least one structured document for the publication, each structured document including one or more entry fields corresponding to the one or more addressable blocks, wherein each structured document includes or refers to version information in the one or more entry fields, and wherein the version information is content that is different for different versions of the publication;

receive a structured document from each of two or more entities;

generate a design application version of the structured document from each of the two or more entities, the design application version compatible with a design application;

automatically generate a plurality of versions of the publication using the design application, wherein the generating of the plurality of versions of the publication is performed after the merging the plurality of structured documents into from the two or more entities a master structured document, wherein each version of the publication is generated using the template, the base content, and version information included in or referred to in at least one structured document received from the two more of the entities, the version information inserted based on the one or more addressable blocks in a page of the version based on the one or more codes associated with the one or more entry fields;

display the plurality of versions of the publication on one page, wherein the page includes a plurality of sections, wherein the sections include the same base content, wherein each section is associated with a different version, wherein each version is associated with a different entity of the two or more entities, and wherein each section includes different version information that corresponds to a different entity, and wherein after all pages of the publication have been generated, the pages are changeable if needed; and after generating a structured document that includes a first page of the publication with multiple versions:

determine if a second page of the publication is to include one or more versions;

generate a template for the second page; and add version information for the template for the second page to one of a structured document that is already created or a new structured document that is generated for the template for the second page.

14. The computer readable storage medium of claim 13, wherein the at least one structured document includes a folder structure configured to store the version information.

15. The computer readable storage medium of claim 13, wherein the at least one structured document includes a reference to the version information, and wherein the reference is used to retrieve the version information to generate a version of the publication.

16. The computer readable storage medium of claim 13, wherein a plurality of pages are created for a plurality of versions using the template and different structured documents.

17. The computer readable storage medium of claim 13, wherein the software is further operable to:

generate a list of missing tasks corresponding to version information that is missing from a page; and determine a page is ready for output when the list of missing tasks has been completed.

18. The computer readable storage medium of claim 13, wherein the page for the version is created using base content that is similar for each of the versions, and wherein each of the versions includes different version information.

19. The computer readable storage medium of claim 13, wherein the software is further operable to:

determine an entry field including version information referred to or included in the entry field;

determine a code associated with the entry field; determine an addressable block in the template associated with the entry field; and insert the version information in the page for the version based on the addressable block.

20. The computer readable storage medium of claim 19, wherein the software is further operable to retrieve the version information from a folder structure or another source based on a reference included in the entry field.

* * * * *